United States Patent
Kato et al.

(10) Patent No.: US 8,174,715 B2
(45) Date of Patent: May 8, 2012

(54) IMAGE FORMING APPARATUS THAT PRINTS IMAGE FILE STORED IN EXTERNAL MEMORY

(75) Inventors: Masashi Kato, Nagoya (JP); Toru Tsuzuki, Okazaki (JP); Hiroyuki Yamamoto, Nagoya (JP); Kazuma Aoki, Kasugai (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1269 days.

(21) Appl. No.: 11/762,972

(22) Filed: Jun. 14, 2007

(65) Prior Publication Data

US 2008/0043281 A1 Feb. 21, 2008

(30) Foreign Application Priority Data

Jun. 28, 2006 (JP) ................................. 2006-177691

(51) Int. Cl.
*G06F 3/12* (2006.01)
*G06K 15/00* (2006.01)
(52) U.S. Cl. ...... 358/1.15; 385/1.13; 385/1.9; 385/1.14; 385/1.16; 348/207.2; 348/231.2; 348/231.3; 348/231.7
(58) Field of Classification Search ................. 358/1.13, 358/1.15, 404, 426.05, 403, 1.16, 1.9; 348/207.1, 348/231.2, 231.3, 207.2; 382/224
See application file for complete search history.

(56) References Cited

U.S. PATENT DOCUMENTS

| | | | |
|---|---|---|---|
| 6,469,770 B2 | 10/2002 | Hoshino et al. | |
| 6,774,980 B2 | 8/2004 | Hoshino et al. | |
| 6,831,754 B1 * | 12/2004 | Delaney | 358/1.15 |
| 6,862,592 B1 * | 3/2005 | Flenniken et al. | 1/1 |
| 6,947,171 B1 | 9/2005 | Narusawa et al. | |
| 6,965,404 B2 * | 11/2005 | Hosoda et al. | 348/231.6 |
| 7,034,958 B1 | 4/2006 | Hara | |
| 7,057,751 B1 | 6/2006 | Shiraiwa | |
| 7,095,516 B2 * | 8/2006 | Yamashita et al. | 358/1.14 |
| 7,148,918 B1 * | 12/2006 | Yoda | 348/211.3 |
| 2002/0051065 A1 | 5/2002 | Takahashi | |
| 2002/0083114 A1 * | 6/2002 | Mazzagatte et al. | 709/100 |
| 2002/0093682 A1 | 7/2002 | Nakajima | |
| 2004/0252335 A1 * | 12/2004 | Yano et al. | 358/1.15 |
| 2005/0111034 A1 * | 5/2005 | Karasaki et al. | 358/1.15 |

(Continued)

FOREIGN PATENT DOCUMENTS

CN 1722762 A 1/2006

(Continued)

OTHER PUBLICATIONS

European Search Report for Application No. 07010513.5 mailed Jun. 8, 2010, 9 pages.

(Continued)

*Primary Examiner* — Twyler Haskins
*Assistant Examiner* — Dennis Dicker
(74) *Attorney, Agent, or Firm* — Banner & Witcoff, Ltd.

(57) ABSTRACT

An image forming apparatus includes: a memory connecting portion, to which an external memory is detachably connected; a detecting portion that detects a connection state of the external memory; a printing portion that prints an image based on an image file to be printed which is stored in the external memory; and a controller that performs an automatic printing processing in which the controller controls the printing portion to automatically start printing the image in response to a detection by the detecting portion of connection of the external memory to the memory connecting portion.

10 Claims, 6 Drawing Sheets

U.S. PATENT DOCUMENTS

| | | | |
|---|---|---|---|
| 2005/0243362 A1* | 11/2005 | Sakuda et al. | 358/1.15 |
| 2005/0275864 A1 | 12/2005 | Sugimura et al. | |
| 2006/0034630 A1 | 2/2006 | Yabe | |
| 2006/0075338 A1 | 4/2006 | Kusakabe et al. | |
| 2006/0123044 A1* | 6/2006 | Minami | 707/102 |
| 2006/0176512 A1* | 8/2006 | Nishimura | 358/1.15 |
| 2006/0238619 A1 | 10/2006 | Takahashi | |
| 2007/0188787 A1* | 8/2007 | Aiso | 358/1.9 |

FOREIGN PATENT DOCUMENTS

| | | |
|---|---|---|
| EP | 0902589 A2 | 3/1999 |
| JP | 63-96672 A | 4/1988 |
| JP | 63-318577 A | 12/1988 |
| JP | 11-007701 A | 1/1999 |
| JP | 11321009 | 11/1999 |
| JP | 2001-096868 A | 4/2001 |
| JP | 2001-109081 A | 4/2001 |
| JP | 2001-306376 A | 11/2001 |
| JP | 2002-024938 A | 1/2002 |
| JP | 2003-260847 A | 9/2003 |
| JP | 2004-318737 A | 11/2004 |
| JP | 2005-111802 A | 4/2005 |
| JP | 2005-174261 A | 6/2005 |
| JP | 2005-178320 A | 7/2005 |
| JP | 2005-324465 A | 11/2005 |
| JP | 2006-079591 A | 3/2006 |
| JP | 2006-107142 A | 4/2006 |
| WO | 2006035599 A1 | 4/2006 |

OTHER PUBLICATIONS

CN Office Action dated Apr. 10, 2009, CN Appln. 200710127950.0.

JP Office Action dtd Jun. 29, 2010, JP Appln. 2008-207707, English translation.

JP Office Action dtd Jul. 10, 2008, JP Appln. 2006-177691 (partial translation).

JP Office Action dtd Sep. 28, 2010, JP Appln. 2008-207707, partial English translation.

JP Office Action dtd Oct. 12, 2010, JP Appln. 2006-177691, English translation.

JP Office Action dtd Jan. 25, 2011, JP Appln. 2006-177691, English Translation.

* cited by examiner

IMAGE FORMING APPARATUS THAT PRINTS IMAGE FILE STORED IN EXTERNAL MEMORY

CROSS-REFERENCE TO RELATED APPLICATION

This application claims priority from Japanese Patent Application No. 2006-177691, filed on Jun. 28, 2006, the entire subject matter of which is incorporated herein by reference.

TECHNICAL FIELD

The present invention relates to an image forming apparatus.

BACKGROUND

A technique to print on a sheet an image based on an image file recorded by a digital camera is provided. For example, Japanese patent No. 3,125,924 discloses a printer in which, when a memory card (external memory) in which an image file is stored is inserted in a card slot, a print start key flashes and a user depresses the print start key, all of the image data stored in the memory card are printed one by one.

However, the printer requires a key operation to perform printing, and the operation becomes troublesome when plural image data that are stored in plural memory cards are to be printed.

Also, when plural image data are stored in a single memory card, it may be desired that not all of the image data but just a group of the image data be printed. For example, when a memory card is inserted, a user performs a key operation on a panel to select image data to be printed and just the selected image data are printed. However, the operation may be troublesome since the user is required to perform the operation of selecting the image data to be printed from among the plural image data.

SUMMARY

The present invention was developed in view of aforementioned problems.

The present invention provides, as an illustrative non-limiting embodiment, an image forming apparatus including: a memory connecting portion, to which an external memory is detachably connected; a detecting portion that detects a connection state of the external memory; a printing portion that prints an image based on an image file to be printed which is stored in the external memory; and a controller that performs an automatic printing processing in which the controller controls the printing portion to automatically start printing the image in response to a detection by the detecting portion of connection of the external memory to the memory connecting portion.

As one of advantages, when the external memory is attached to the apparatus, printing of the image data is started automatically even if a user does not perform any operations. The operation necessary to print the image data is eliminated. Other feature and advantages will be discussed in detail with reference to the accompanying drawings.

DETAILED DESCRIPTION

An embodiment of the present invention shall now be described with reference to FIG. 1 to FIG. 6.

(The Entire Printer Configuration)

Figure 1:
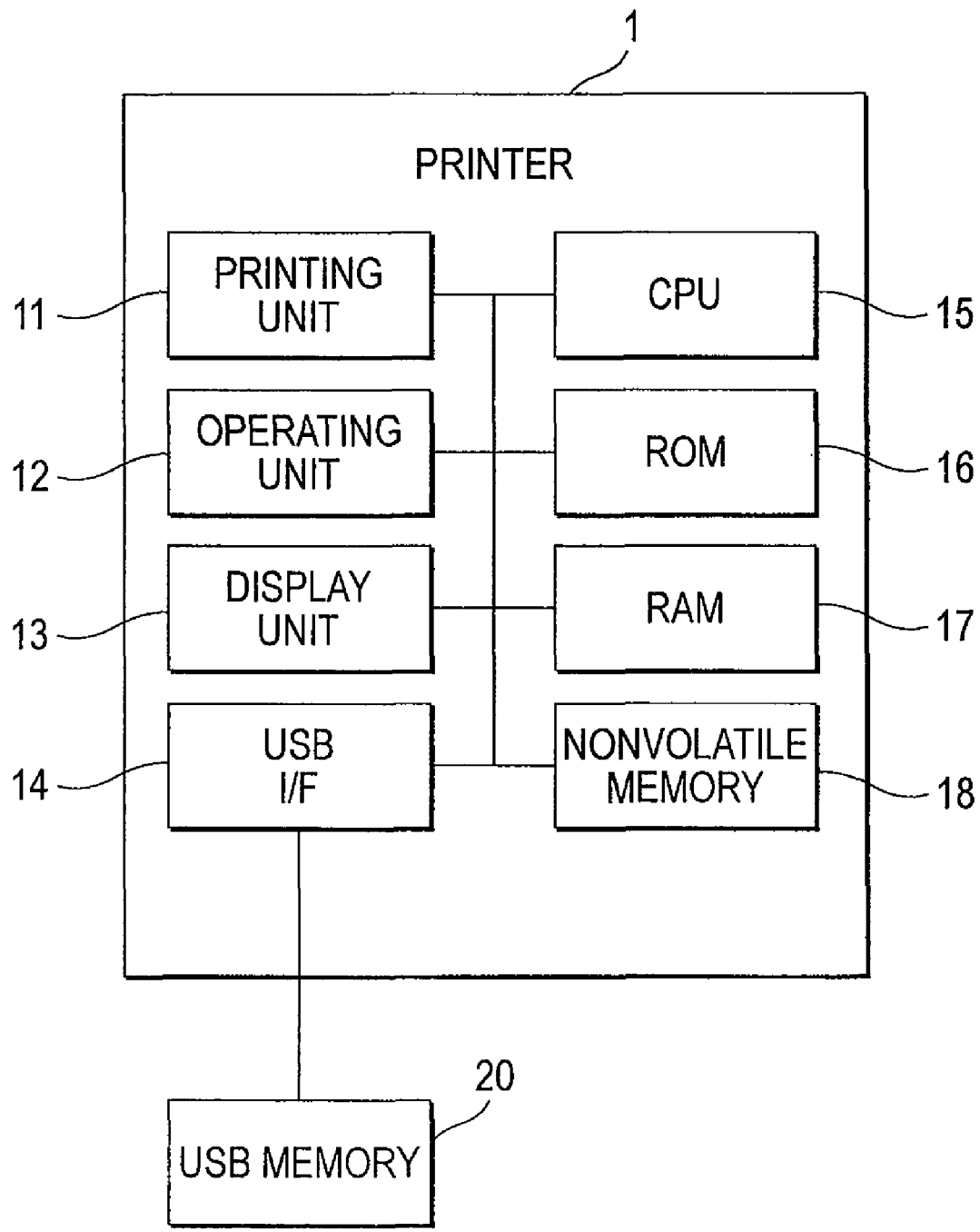
FIG. 1 is a block diagram of an electrical configuration of a printer according to an embodiment of the present invention and a USB memory.

FIG. 1 is a schematic block diagram of an electrical configuration of a printer 1 (example of an image forming apparatus) according to the present invention. The printer 1 includes a printing unit 11 (example of printing portion) that performs printing onto paper as a printing medium, an operating unit 12 (example of a selecting portion, a print selecting portion, a directory setting portion, a printing confirming portion, and an automatic printing setting portion) by which a user can operatively input operations, a display unit 13 (example of a display portion) that performs display, a USB interface 14 (example of a memory connecting portion and a detecting portion), a CPU 15 (example of a controller), a ROM 16, a RAM 17, and a nonvolatile memory 18.

Figure 2:
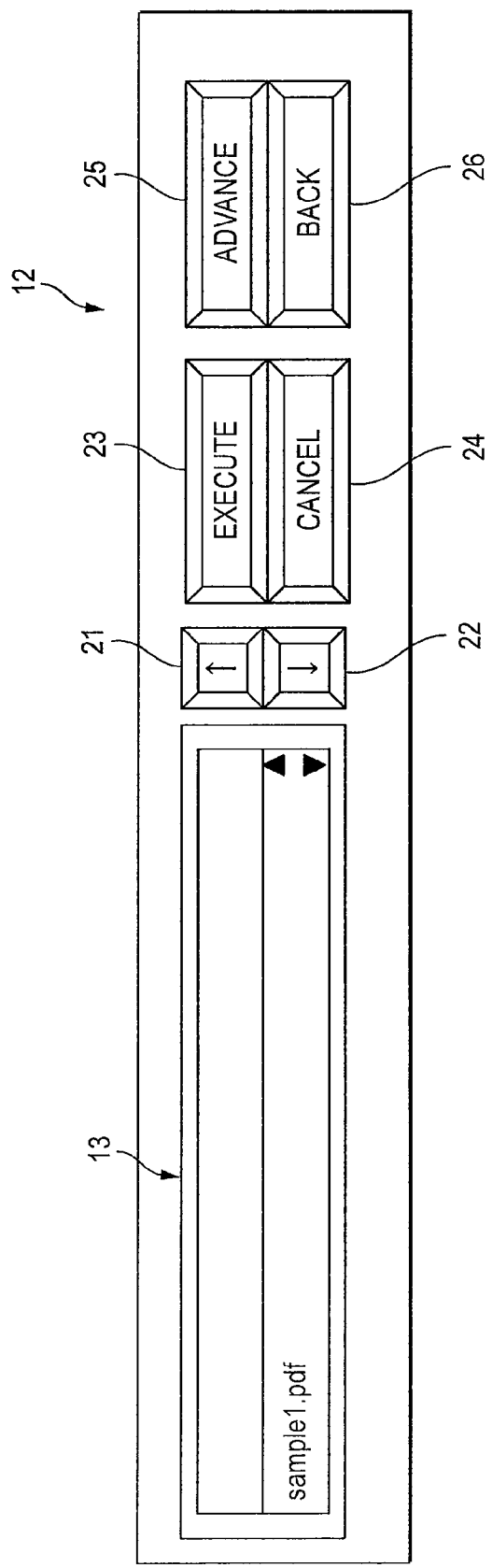
FIG. 2 is a plan view of an operating unit and a display unit.

FIG. 2 shows the operating unit 12 and the display unit 13 disposed on a surface of the main case of the printer 1. The operating unit 12 includes an up key 21, a down key 22, an execute key 23, a cancel key 24, an advance key 25, and a back key 26. The display unit 13 includes a horizontally long liquid crystal display panel.

A USB memory 20 (example of an external memory) is detachably connected to the USB interface 14, and data inside the USB memory 20 is read into the printer 1 via the USB interface 14. The USB interface 14 also detects the attachment/detachment state of the USB memory 20 and outputs the detection signal to the CPU 15.

A program for performing a USB printing processing, to be described below, and various control programs for controlling the printer 1 are stored with various settings, initial values, etc., in the ROM 16. The RAM 17 is used as a work area into which the various control programs are read out. As shall be described below, various settings, etc., are stored in the nonvolatile memory 18.

The CPU 15 controls operations of the printing unit 11 and the display unit 13 in accordance with the control program read from the ROM 16 while storing processing results in the RAM 17 or the nonvolatile memory 18.

(Directory Structure Inside the USB Memory 20)

Figure 3:
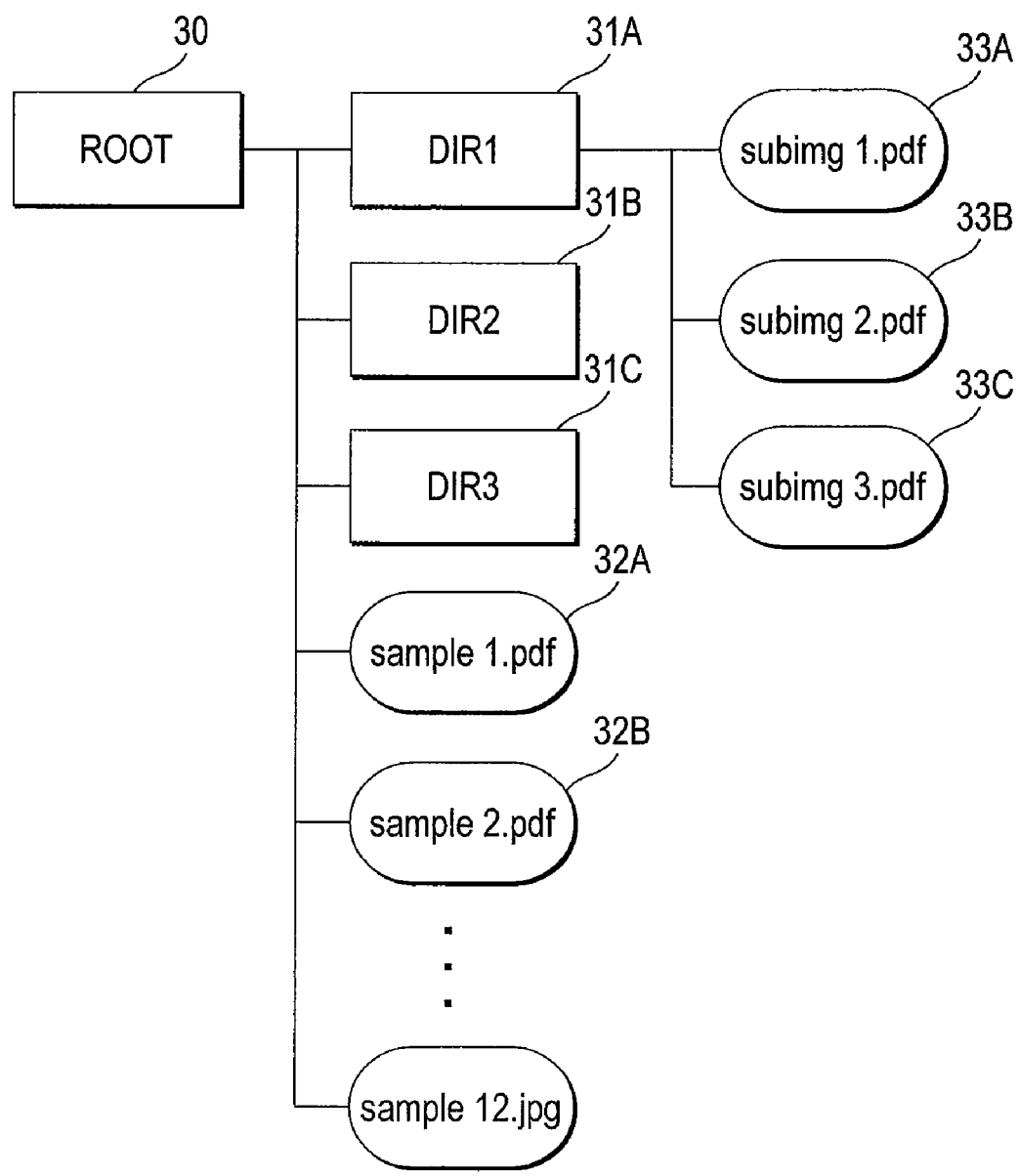
FIG. 3 is a conceptual diagram of a directory structure inside the USB memory.

FIG. 3 is a conceptual diagram of an example of a directory structure formed inside the USB memory 20. As shown in this figure, the USB memory 20 has such a tree-structure file system that plural directories are arranged hierarchically. Plural image data files are classified and stored respective directories by user's preference. Specifically, three directories (sub-directories) 31A to 31C and plural image data files 32A, 32B, . . . are stored in an uppermost directory (hereinafter referred to as "ROOT directory 30"). Furthermore, three image data files 33A, 33B and 33C are stored in the sub-directory 31A.

(Settings Stored in the Nonvolatile Memory)

Various settings used in the USB printing processing described below are stored in the nonvolatile memory 18. Specifically, whether to perform or not automatic printing processing (automatic printing setting), whether to perform or not selective printing processing after the automatic printing processing ends (setting of selective printing when automatic printing processing is performed), whether to perform or not the selective printing processing when the automatic printing processing is not performed (setting of selective printing processing when automatic printing processing is not performed), and other setting flags, a reference value that is an upper limit for performing automatic printing processing, a specified directory for performing selection of files to be printed, etc. are stored. The CPU 15 is capable of performing a setting program based on input operations performed from the operating unit 12, and the respective settings described above can be changed by the user performing input operations from the operating unit 12 while referencing the display on the display unit 13 during performing of the setting program.

(USB Printing Processing)

Figure 4:
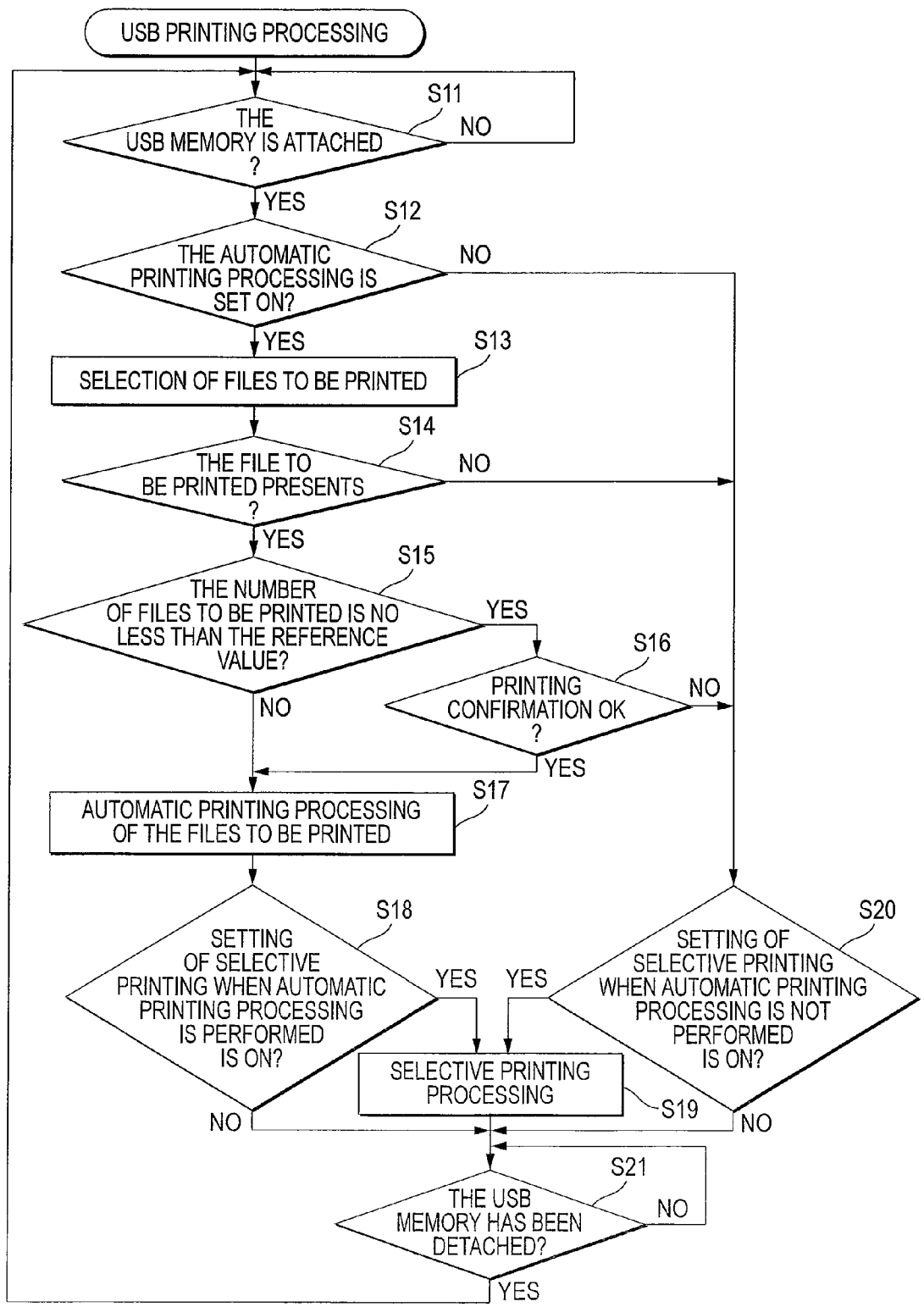
FIG. 4 is a flowchart of a USB printing processing.

With the printer 1, the USB printing processing described below is performed under control by the CPU 15. FIG. 4 is a flowchart of the USB printing processing.

Upon starting the USB printing processing, the CPU 15 first determines whether or not the USB memory 20 is attached to the USB interface 14 (S11). Here, if the USB memory 20 is not attached (S11: No), the same process is repeated until the USB memory 20 is attached, that is, a standby state of waiting for the attachment of the USB memory 20 is entered. In the standby state, the automatic printing processing can be performed.

When the USB interface 14 detects the attachment of the USB memory 20 (S11: Yes), the CPU 15 refers the nonvolatile memory 18 to check whether or not the automatic printing setting is ON (S12). If the automatic printing setting is OFF (S12: No), S20, to be described below, is entered without performing automatic printing processing. If the automatic printing setting is ON (S12: Yes), selection of files as objects to be printed is performed (S13). Here, all image data files inside a directory that is set in advance as a specified directory are selected as the objects to be printed. For example, if the sub-directory 31A below the root directory 30 is specified as the specified directory, the image data files 33A, 33B and 33C, stored in the sub-directory 31A, are selected as the objects to be printed.

The CPU 15 then determines whether or not the image data files selected as the objects to be printed are present (S14). Here, if not even one image data file is present in the specified directory or the specified directory itself is not present in the USB memory 20 (S14: No), the below-described S20 is entered without performing automatic printing processing.

If the selected image data files are present (S14: Yes), whether or not the number of the selected image data files is no less than the reference value is determined (S15). If the number of the selected image data files is no less than the reference value (S15: Yes), a confirmation message that inquires the user to confirm whether printing is to be performed or not (enabling or not enabling of performing printing) is displayed on the display unit 13 (S16), and if the input indicating that printing is not to be performed (performing printing is not enabled) is made from the operating unit 12 (S16: No), the below-described S20 is entered without performing automatic printing processing. If the input indicating that printing is to be performed (performing printing is enabled) is made from the operating unit 12 (S16: Yes) and the number of image data files selected in S15 is less than the reference value, automatic printing processing is performed by the printing unit 11 (S17). All of the image data files selected as the objects to be printed are read one by one from the USB memory 20 into the printing unit 11. The printing unit prints onto paper images based on the respective image data files one by one.

After the printing of all of the image data files selected as the objects to be printed (automatic printing processing) is completed, whether or not the setting of selective printing processing when automatic printing processing is performed is ON is determined (S18), and if this setting is ON (S18: Yes), the selective printing processing, described below, is performed (S19). If in the above-described processing, automatic printing processing is not performed, that is, if the automatic printing setting is OFF in S12 (S12: No) or the image data files to be printed are not present in S14 (S14: No) or the user makes the input of not enabling the performing printing in S16 (S16: No), whether or not the setting of selective printing when automatic printing processing is not performed is ON is determined (S20), and if this setting is ON (S20: Yes), the selective printing processing is performed (S19).

(Selective Printing Processing)

Figure 5:
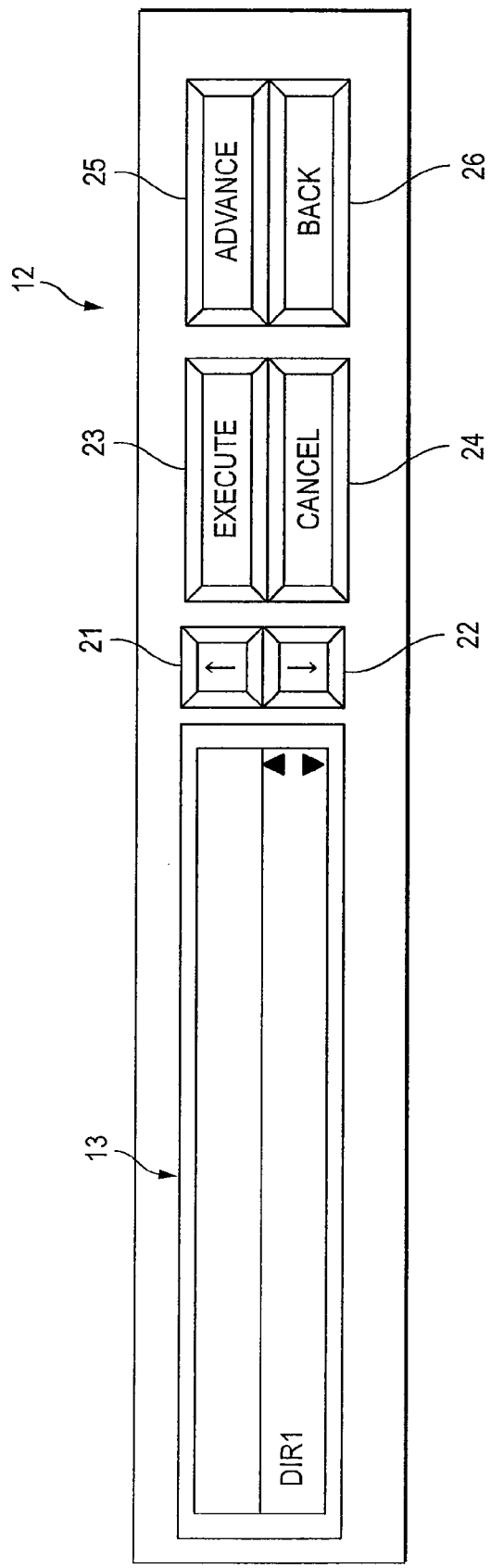
FIG. 5 is a plan view of a display example of the operating unit and the display unit.
Figure 6:
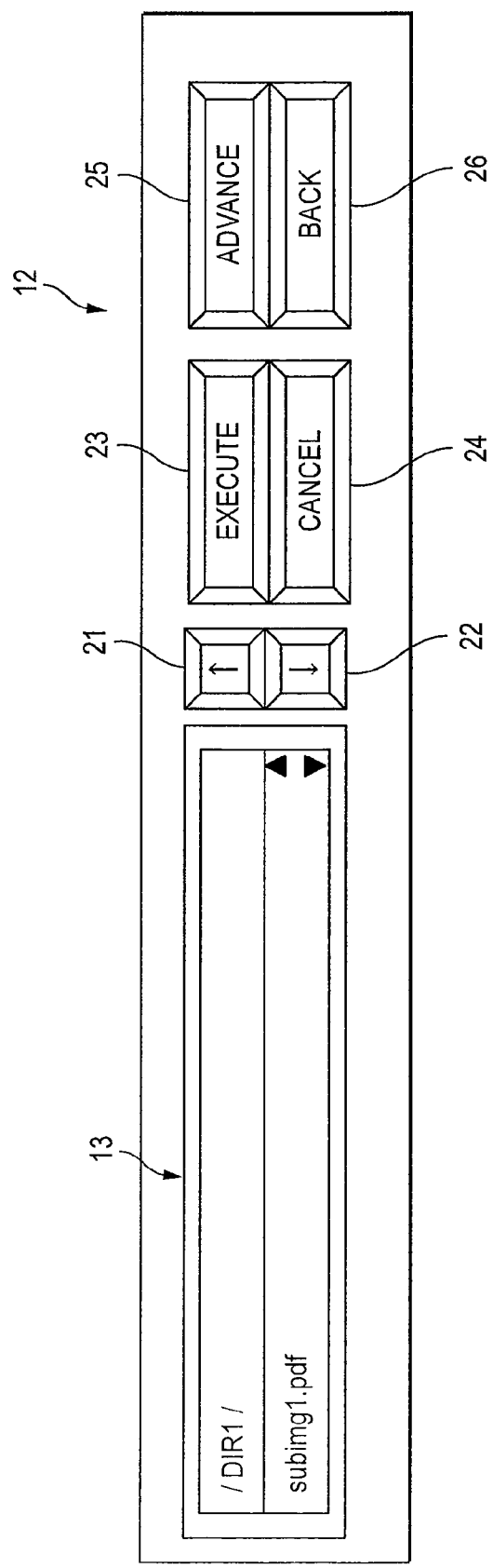
FIG. 6 is a plan view of a display example of the operating unit and the display unit.

FIGS. 2, 5, and 6 show examples of display on the display unit 13. When the selective printing processing is performed, the screen of the display unit 13 is partitioned into two windows, i.e. an upper display portion and a lower display portion juxtaposed vertically. In the upper display portion of the display unit 13 is displayed a path name (position information) indicating a position in a hierarchical structure of a directory (hereinafter referred to as "current directory") that is currently the object of display (processing). In the lower display portion of the display unit 13, names (identification information) of image data and directories stored in the current directory are displayed one by one.

When the selective printing processing starts, first, "/," which indicates the root directory 30, is displayed in the upper display portion of the display unit 13, and the name of a single image data file (such as "sample.pdf") that is stored immediately under the root directory 30 is displayed in the lower display portion. Here, in accordance with operation of the up key 21 or the down key 22, the names of the image data files 32A, 32B, . . . and the sub-directories 31A, 31B and 31C under the root directory 30 are displayed successively one by one in a scrolled manner.

When the execute key 23 or the advance key 25 is depressed while an image data file name is displayed in the lower display portion as shown in FIG. 2, the file, the name of which is displayed at that point, is selected and an image based on that image data file is printed by the printing unit 11. Also, if when a sub-directory name (such as "DIR1") is displayed in the lower display portion as shown in FIG. 5, the advance key 25 is depressed, the path name of that sub-directory (such as "/DIR/") is then displayed in the upper display portion and the name of an image data file (such as "subimg1.pdf") under that sub-directory or the name of sub-directory under that sub-directory is displayed in the lower display portion as shown in FIG. 6. When the execute key 23 or the advance key 25 is depressed while an image data file name under the sub-directory is displayed in the lower display portion of the displayed unit 13, the file, the name of which is displayed at that point, is likewise selected and an image based on that image data file is printed by the printing unit 11. In the selective printing processing, a user can thus select and print out an arbitrary image data file from among the image data files stored in the USB memory.

If the USB memory 20 is detached from the printer 1, etc., during the selective printing processing, the selective printing processing ends. After the selective printing processing ends, if the setting of selective printing when automatic printing processing is performed has been OFF in S18 (S18: No) or the setting of selective printing when automatic printing processing is not performed had been OFF in S20 (S20: No), whether or not the USB memory 20 is detached from the USB interface 14 is determined (S21). Here, if the USB memory 20 is not detached (S21: No), the same processing is repeated until the USB memory 20 is detached. If the USB memory 20 is detached, S11 is returned to, that is, the standby state of waiting for the attachment of the USB memory 20 is entered.

Effects of the Present Embodiment (1) According to the present embodiment, when the USB memory 20 is attached to the printer 1, the printing of the image data is started automatically (S17) even if the user does not perform any operations. The operation necessary to print the image data is eliminated.

(2) When the USB memory 20 is attached to the printer 1, the image data to be printed are selected automatically (S13) and the printing of the selected image data is started (S17) even if the user does not perform an operation of selecting the data to be printed. The operation necessary to print just a group of the image data is eliminated.

(3) Because from among the image data stored in the USB memory 20, the image data, stored in the directory that is specified in advance, are selected as the objects to be printed (S13), the user can easily apportion image data that are to be printed and image data that are to be printed in directory units.

(4) Because after performing the automatic printing processing (S17), the selective printing processing is performed successively (S19), the configuration is favorable for cases where the user wishes to arbitrarily select and print image data in the USB memory 20.

(5) By setting in advance whether to perform or not the selective printing processing after the automatic printing processing ends, the user is, for example, free from being required to perform an operation of canceling the performing of the selective printing processing if the selective printing processing is unnecessary.

(6) Because when the selective printing processing is started (S19), the uppermost directory is displayed first, the user can quickly find the image data that are desired to be printed.

(7) Because after the detection of detachment of the USB memory 20 (S21: Yes) following the end of the automatic printing processing (S17), the standby state is entered in which re-performing the automatic printing processing is enabled (S11), printing can be performed rapidly in cases where image data stored in plural external memories are to be printed.

(8) If the image data to be printed by the automatic printing processing are not present (S14: No), the selective printing processing is performed (S19). Because when the selective printing processing is started, the uppermost directory is displayed first, the user can quickly find the image data that are desired to be printed.

(9) By setting in advance whether to perform or not the selective printing processing in the case where the automatic printing processing is not to be performed, the user is, for example, free from being required to perform an operation of canceling performing the selective printing processing if the selective printing processing is unnecessary.

(10) The configuration is also convenient because a directory that the user uses frequently can be set in advance as the specified directory for selection of the image data to be printed.

(11) Because printing is not started if the number of the image data to be printed is equal to or greater than the reference number (S15: Yes), unintended printing of a large number of images can be prevented.

(12) Whether to perform or not printing of the reference number of image data or more can be set according to the user's determination (S16).

(13) Whether the automatic printing processing is to be performed or not when the USB memory 20 is attached can be switched according to the user's circumstances.

(14) When the USB memory 20 is attached, the image data are selected automatically (S13) even if the user does not perform any operations. The operation necessary to print just a portion of the image data is eliminated.

Other Embodiments

The present invention is not limited to the embodiment described by the above description and drawings and, for example, the following embodiments also fall within the scope of the art of the present invention.

(1) The embodiment employed the USB memory as an example of the external memory. However, the present invention is not limited thereto. For example, the external memory may be a Compact Flash® memory, a Smart Media®, or a Memory Stick™, etc.

(2) The aforementioned embodiment is configured such that a printer having the function of printing image data taken in from the external memory is described, the present invention can also be applied to a printer having, in addition to the above function, a printer function of printing image data transmitted from a PC, etc., a scanner function, a facsimile function, etc.

The present invention provides illustrative, non-limiting embodiments as follows:

(1) An image forming apparatus includes: a memory connecting portion, to which an external memory is detachably connected; a detecting portion that detects a connection state of the external memory; a printing portion that prints an image based on an image file to be printed which is stored in the external memory; and a controller that performs an automatic printing processing in which the controller controls the printing portion to automatically start printing the image in response to a detection by the detecting portion of connection of the external memory to the memory connecting portion.

(2) In the image forming apparatus according to (1), the controller may select the image file to be printed from among plural image files stored in the external memory.

(3) In the image forming apparatus according to (2), the external memory may store therein plural directories hierarchically, and the controller may select the image file to be printed, which is included in a specified directory among the plural directories.

(4) The image forming apparatus according to any one of (1) to (3) further includes: a display portion that displays information for identifying plural image files stored in the external memory; and a selecting portion, by which a user can operatively select an image file to be printed from among the plural image files with reference to the information displayed on the display portion. After the automatic printing processing ends, the controller may perform a selective printing processing in which the controller controls the display portion to display the information and controls the printing portion to print an image based on the image file selected by the selecting portion.

(5) The image forming apparatus according to (4) further includes a print selecting portion, by which a user can operatively select whether or not the controller performs the selective printing processing after the automatic printing processing ends.

(6) In the image forming apparatus according to (4) or (5), the external memory may store therein plural directories hierarchically. The display portion may display a content of each directory stored in the external memory according to an operation to the selecting portion. The controller may control the display portion to display a content of an uppermost directory among the hierarchically structured directories in the external memory after the automatic printing processing ends.

(7) In The image forming apparatus according to (5), when it is selected that the controller does not perform the selective printing processing after the automatic printing processing ends, and when disconnection of the external memory from the memory connecting portion is detected by the detecting portion, the controller may enters a standby state in which the controller can perform the automatic printing processing.

(8) The image forming apparatus according to (3) further includes: a display portion that displays information for identifying the plural image files stored in the external memory; and a selecting portion, by which a user can operatively select an image file from among the image files stored in the external memory with reference to the information displayed on the display portion. When the specified directory includes no file, the controller may perform a selective printing processing in which the controller controls the display portion to display the information for identifying an image file included in an uppermost directory among the hierarchically structured directories and controls the printing portion to print an image based on the image file selected by the selecting portion.

(9) The image forming apparatus according any one of (4) to (8), further includes a print selecting portion, by which a user can operatively select whether or not the controller performs the selective printing processing when the controller dose not perform the automatic printing processing.

(10) The image forming apparatus according to any one of (3) to (9) further includes a directory setting portion, by which a user can operatively set the specified directory.

(11) In the image forming apparatus according to any one of (1) to (10), the controller may control the printing portion to start printing images based on image files when a number of the image files to be printed is less than a reference number and not to start printing images when the number of the image files to be printed is equal to or greater than the reference number.

(12) The image forming apparatus according to (11) further includes a printing confirming portion, by which a user can operatively allow the printing portion to start printing images. When the number of the image files to be printed is equal to or greater than the reference number, and when the printing portion is allowed by the printing confirming portion to start printing images, the controller may control the printing portion to start printing images based on the image files to be printed.

(13) The image forming apparatus according to any one of (1) to (12) further includes an automatic printing setting portion, by which a user can operatively select whether or not the controller performs the automatic printing processing in response to the detection by the detecting portion of connection of the external memory to the memory connecting portion.

(14) An image forming apparatus includes: a memory connecting portion, to which an external memory is detachably connected, the external memory storing therein plural directories hierarchically; a detecting portion that detects a connection state of the external memory; a printing portion that prints an image based on an image file to be printed, the image file being stored in a specified directory among the plural directories; and a controller that selects an image file as the image file to be printed in response to a detection by the detecting portion of the connection of the external memory to the memory connecting portion.

(15) In the image forming apparatus according to (4), the controller may perform the selective printing processing after the image is printed by the printing portion in the automatic printing processing performed by the controller.

(16) In the image forming apparatus according (4), the display portion may display the information according to an operation to the selecting portion.

What is claimed is:
1. An image forming apparatus comprising:
a memory connecting portion, to which an external memory is detachably connectable;
a detecting portion configured to detect a connection state of the external memory;
a printing portion configured to print an image based on an image file to be printed which is stored in the external memory;
a controller configured to perform an automatic printing processing in which the controller is configured to cause the printing portion to automatically start printing the image without user interaction in response to the detecting portion detecting connection of the external memory to the memory connecting portion;
a display portion configured to display information for identifying a plurality of image files stored in the external memory; and
a selecting portion configured to allow a user to operatively select an image file to be printed from among the plurality of image files with reference to the information displayed on the display portion; and
a print selecting portion,
wherein after the automatic printing processing ends, the controller is configured to perform a selective printing processing in which the controller controls the display portion to display the information and controls the printing portion to print an image based on the image file selected by the selecting portion,
wherein the print selection portion is configured to allow a user to operatively select whether or not the controller performs the selective printing processing after the automatic printing processing ends, and
wherein when a user selects that the controller not perform the selective printing processing after the automatic printing processing ends, and when disconnection of the external memory from the memory connecting portion is detected by the detecting portion, the controller is configured to enter a standby state in which the controller is enabled to perform the automatic printing processing.

2. The image forming apparatus according to claim 1,
wherein the controller is configured to control the printing portion to start printing images based on image files when a number of the image files to be printed is less than a reference number and to not start printing images when the number of the image files to be printed is equal to or greater than the reference number.

3. The image forming apparatus according to claim 2, further comprising:
a print selecting portion configured to allow a user to operatively select whether or not the controller performs the selective printing processing when the controller does not perform the automatic printing processing.

4. The image forming apparatus according to claim 2, further comprising a printing confirming portion configured to allow a user to operatively allow the printing portion to start printing images,
wherein when the number of the image files to be printed is equal to or greater than the reference number, and when the printing portion is allowed by the printing confirming portion to start printing images, the controller controls the printing portion to start printing images based on the image files to be printed.

5. The image forming apparatus according to claim 2, further comprising an automatic printing setting portion configured to allow a user to operatively select whether or not the controller performs the automatic printing processing in response to the detecting portion detecting connection of the external memory to the memory connecting portion.

6. The image forming apparatus according to claim 2,
wherein the controller is configured to select the image file to be printed from among a plurality of image files stored in the external memory.

7. The image forming apparatus according to claim 6,
wherein the controller is configured to select the image file to be printed from a specified directory among a plurality of directories hierarchically stored in the external memory.

8. The image forming apparatus according to claim 7, further comprising:
a display portion configured to display information for identifying the plurality of image files stored in the external memory; and
a selecting portion configured to allow a user to operatively select an image file from among the image files stored in the external memory with reference to the information displayed on the display portion;
wherein when the specified directory includes no file, the controller is configured to perform a selective printing processing in which the controller controls the display portion to display the information for identifying an image file included in an uppermost directory among the hierarchically structured directories and controls the printing portion to print an image based on the image file selected by a user via the selecting portion.

9. The image forming apparatus according to claim 7, further comprising a directory setting portion configured to allow a user to operatively set the specified directory.

10. An image forming apparatus comprising:
an external memory interface configured to receive a detachable external memory storing therein a plurality of directories hierarchically;
a detector configured to determine whether the external memory is connected to the external memory interface;
a printing unit configured to print an image based on an image file to be printed, which is stored in the external memory;
a controller configured to cause the printing unit to print an image file as the image file to be printed without receiving a user selection of the image file in response to the detector detecting that the external memory is connected to the external memory interface; and
a processing unit configured to determine whether an automatic print operation is enabled in response to the detector determining that external memory is connected to the external memory interface,
wherein the controller is configured to control the printing portion to start printing images based on image files when a number of the image files to be printed is less than a reference number and to not start printing images when the number of the image files to be printed is equal to or greater than the reference number, and
wherein the controller is configured to cause the printing unit to print without receiving a user selection of the image file if the processing unit determines that the automatic print operation is enabled.

* * * * *